United States Patent [19]

Spink et al.

[11] Patent Number: 5,439,509

[45] Date of Patent: Aug. 8, 1995

[54] STRIPPING METHOD AND APPARATUS

[75] Inventors: Donald R. Spink; Kim D. Nguyen, both of Waterloo, Canada

[73] Assignee: Turbotak Inc., Waterloo, Canada

[21] Appl. No.: 160,662

[22] Filed: Dec. 2, 1993

Related U.S. Application Data

[63] Continuation-in-part of Ser. No. 824,110, Jan. 22, 1992, abandoned.

[30] Foreign Application Priority Data

Jan. 22, 1991 [GB] United Kingdom ............. 9101336

[51] Int. Cl.$^6$ .......................................... B01D 19/00
[52] U.S. Cl. ..................................... 95/166; 95/168; 95/169; 95/235; 95/264; 96/203
[58] Field of Search ................ 55/228; 95/166, 168, 95/169, 186, 224, 235, 237, 245, 264; 96/188, 203, 205

[56] References Cited

U.S. PATENT DOCUMENTS

| | | | |
|---|---|---|---|
| 2,845,137 | 7/1958 | Sebald | 95/264 |
| 4,133,650 | 1/1979 | Germerdonk et al. | 95/168 |
| 4,369,167 | 1/1983 | Weir, Jr. | 95/224 |
| 4,865,817 | 9/1989 | Burgess et al. | 422/168 |
| 4,893,752 | 1/1990 | Spink et al. | 239/427.3 |
| 4,963,329 | 10/1990 | Burgess et al. | 422/168 |
| 5,019,361 | 5/1991 | Hakka | 423/243 |
| 5,023,064 | 6/1991 | Burgess et al. | 423/242 |
| 5,170,942 | 12/1992 | Spink et al. | |
| 5,192,517 | 3/1993 | Spink | 423/243.08 |

FOREIGN PATENT DOCUMENTS

| | | | |
|---|---|---|---|
| 303501 | 2/1989 | European Pat. Off. | |
| 0331228 | 9/1989 | European Pat. Off. | 95/186 |
| 2046753 | 4/1972 | Germany | 95/235 |

*Primary Examiner*—C. Scott Bushey
*Attorney, Agent, or Firm*—Sim & McBurney

[57] ABSTRACT

Solute gas-rich absorbing media formed in scrubbing a solute gas from an off-gas stream prior to discharge of the same are regenerated to solute gas-lean absorbing medium for recycle to the scrubbing operation. Hot solute gas-rich absorbing media is formed into one or more spray patterns of very small liquid droplets in a flowing purge steam stream in a chamber into which the solute gas is desorbed from the droplets. The droplets are coalesced to form a regenerated absorption medium, the solute gas-containing gas stream is cooled to condense out the steam and a pure solute gas stream is recovered. The operation may be effected in multiple stripping stages, which may utilize cocurrent flow of solute gas laden absorbing medium and purge steam within a single chamber or in multiple chambers. Multiple stripping steps may be effected within a single stripping stage.

30 Claims, 4 Drawing Sheets

STRIPPING METHOD AND APPARATUS

REFERENCE TO RELATED APPLICATION

This application is a continuation-in-part of US patent application Ser. No. 824,110 filed Jan. 22, 1992 now abandoned.

FIELD OF INVENTION

The present invention relates to a novel form of stripping operation for the removal of dissolved gases from liquid solvents or absorbents therefor.

BACKGROUND TO THE INVENTION

In previously issued U.S. Pat. Nos. 4,865,817, 4,963,329, 5,023,064 and 5,192,517 as well as concurrently pending U.S. patent applications Ser. Nos. 672,021 now U.S. Pat. No. 5,362,464 and 754,643, all assigned to the assignee hereof and the disclosures of which are incorporated herein by reference, there is disclosed a gas reacting apparatus and method for the wet mass transfer of solute gases from a gas stream to a liquid reacting medium capable of chemisorption of the solute gases from or contained in the gas stream.

The basis of the above patents and applications and also why the unique approach to gas absorption described therein works so effectively relates to the exceptionally large surface area of liquid absorption medium in the form of very small droplets of the liquid absorption medium generated in-duct with two-phase atomizing nozzles or certain hydraulic nozzles or any other device which will create a spray of fine droplets. Accordingly, there have been developed commercial applications of such technology for the removal of acidic gases, such as $SO_2$, $H_2S$, $Cl_2$, $ClO_2$, $NO_x$, HCl, HF, $SO_3$, etc. using a variety of absorption media. In most of these applications, the absorption media chemically react with the acidic gas, sometimes to oxidize it or reduce it or otherwise to form a stable reaction product, that may be disposed of or otherwise treated for disposal. Apparatus embodying such techniques is known by our assignee as the "Waterloo Scrubber".

In some cases of such solute gas absorption process, the absorption media can be regenerated. Often, the regeneration step is accomplished by steam stripping in more or less conventional tray or packed columns. This steam stripping regeneration procedure is an industrial process step that is widely used throughout the chemical industry for many differing desorbing or separating requirements, and not simply for the regeneration of absorption media used to remove solute gases by the procedures described in the above patents and applications.

The steam which is used in such stripping operations usually is generated in a reboiler located at the base of the conventional tray or packed column and rises in counter-current flow to the loaded liquid absorption medium, which normally is fed to the middle of the column and passes tray-to-tray or over the packing down the column. Overhead product reflux generally is employed to further purify the overhead product. The steam (gas)liquid contact in such operations where a tray column is employed is confined to the interfacial area generated as the bubbles of steam pass through the shallow layer of liquid absorption medium covering each tray in the column. In normal practice, each equilibrium stage represents a number of trays. The number of equilibrium stages required to effect separation of the absorbed component varies and is dependent on the particular system under consideration, i.e. vapor-liquid equilibrium data and specific operating conditions.

SUMMARY OF INVENTION

The unique features that have enabled the Waterloo Scrubber to be especially efficient at absorption also are employed in the present invention to reverse the absorption step in a desorption or steam-stripping operation. Accordingly, the present invention relates to the removal of absorbed gases from absorbing media. In view of the large number of more-or-less conventional steam stripping operations carried out in the chemical industry, the apparatus and process described below and provided in accordance with this invention is considered to have broad applications in this industrial segment as well as other industrial segments wherein steam stripping is carried out.

Accordingly, in one aspect, the present invention provides a method for the removal of a solute gas from a solute gas-laden aqueous or organic absorbing medium, which comprises:

(a) providing a chamber having an inlet thereto and an outlet therefrom and heating means operatively associated therewith for maintaining the temperature therein above the adiabatic saturation temperature of steam, (b) injecting said absorbing medium at an elevated temperature directly into said chamber to form at least one spray pattern of said absorbing medium in said conduit containing liquid droplets ranging in size from about 5 to about 300 microns, (c) desorbing dissolved solute gas and some water vapor from said liquid droplets of absorbing medium due to the high vapor pressure of the solute gas and water vapor over the absorbing medium at the temperature and other conditions present, (d) agglomerating said liquid droplets at said downstream end of said conduit to remove entrained liquid droplets from said gas stream to form an at least partially regenerated aqueous absorbing medium, and (e) discharging a gaseous mixture comprising solute gas and steam from said downstream end of said conduit and recovering said solute gas from said gaseous mixture.

A flowing gas stream may be provided comprising steam co-current to the flow of injected absorbing medium, if necessary, to supplement the gas flow exiting the desorption conduit to provide a minimal gas velocity through the agglomerating apparatus to effect its performance.

The references herein to droplet size refer to the conventional Sauter mean diameter, i.e. $D_{sm}$ or $d_{32}$. The equivalent droplet sizes in mass mean diameter also may be used.

GENERAL DESCRIPTION OF INVENTION

Figure 1:
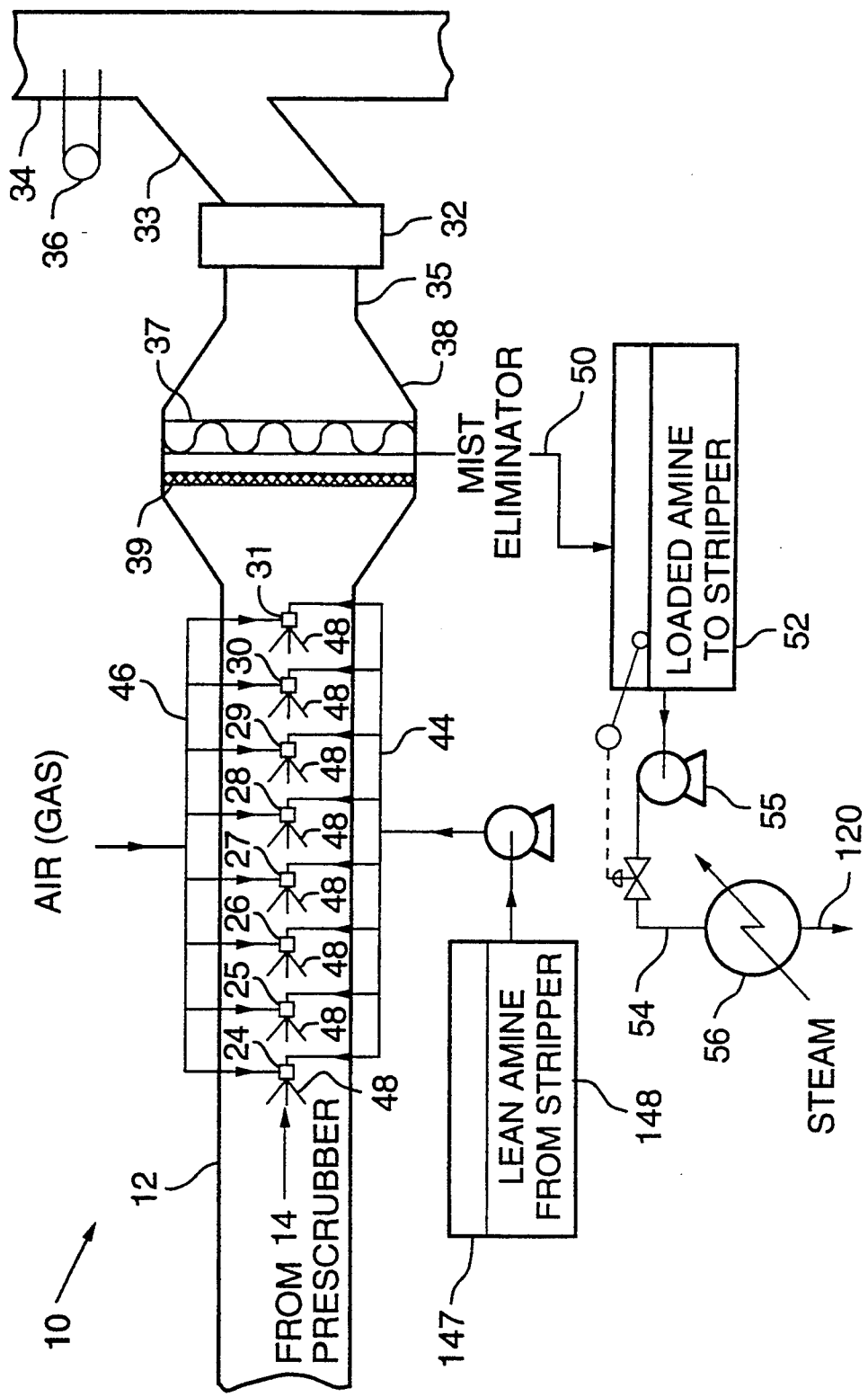
FIG. 1 is a schematic flow sheet of an $SO_2$-absorbing operation.

The invention is mainly described herein with reference to an amine absorbing medium loaded with $SO_2$. However, it is readily apparent that the invention broadly relates to the stripping of any absorbed gas from any absorbing medium in which the gas is absorbed. For a solvent or other liquid absorbing medium (loaded with $SO_2$ or other gas) that can be reversibly stripped by heating of the solvent by steam or other means to attain the desired temperature, one or more steps of adiabatic flashing coupled with some degree of heat stripping, where exceptionally large surface areas of liquid absorbing medium are produced according to the invention, may be incorporated into very compact equipment and effect optimal separation of the $SO_2$ or other dissolved gas from the solvent in a minimal number of stages, in contrast to conventional tray columns, which is more capital intensive, uses more energy in terms of the quantity of steam required per unit of $SO_2$ released and results in a potential for more solvent degradation due to the much longer exposure in the stripper.

One class of absorption media of interest in the present invention is water-soluble single salts of secondary and tertiary di-amines, as described in U.S. Pat. No. 5,019,361, and water-soluble members of the hydroxyalkyl 2-piperazinone family, as described in published EP 303,501, both of which represent stable, high boiling chemical compounds useful as absorbing media for the removal of sulfur dioxide from gas streams using the techniques described above. These latter compounds are characterized with an especially high degree of selectivity for the chemisorption of $SO_2$ from industrial gas streams at temperatures below about 70° C. and normally at the adiabatic dewpoint of the gas stream or, preferably, at lower or at ambient temperatures. With these organic solvents, the chemisorption process which removes the $SO_2$ from the gas stream can readily be reversed at some higher temperature to effect desorption of the $SO_2$ and regeneration of the absorption media. One such procedure is described in U.S. Pat. No. 5,019,361.

In conventional practice, steam distillation is employed to reverse the absorption process and regenerate the absorption media. In such instances, the off-gas stream from the regeneration step contains only $SO_2$ and steam. After condensation by cooling of the steam and removal of the resulting water, a clean flow of $SO_2$ can be produced, which, after drying, is the pure product of the cyclic absorption-desorption operation. The same result is achieved by the process of this invention. With one major difference, namely that the use of spraying technology reduces the length of time the absorption medium is exposed to the high temperature required to effect the desorption process. Thus, for the normal case where a tray column is used, exposure at the normal saturation temperature for steam, i.e. 100° C., lasts for minutes, perhaps as many as ten minutes or more whereas the use of spraying technology will reduce this exposure time to less than one minute and more likely to less than 10 seconds. This reduced exposure at temperature is most beneficial as it will significantly reduce deterioration of the sorbent due to oxidation and other reactions that lead to a build-up of heat stable salts of the sorbent. Thus, a furnace or process off-gas stream containing $SO_2$ may be contacted by absorption media to remove $SO_2$ contaminant and any particulate present prior to venting the clean gas stream to a suitable stack and the absorption medium may be regenerated for reuse using spraying technology while recovering the $SO_2$ as a pure gas stream. The absorption medium resulting from the regeneration operation and having a substantially decreased $SO_2$ content is recycled to the absorption step. The by-product pure $SO_2$ stream can be used or sold as such or can be easily converted to sulfuric acid or, where specific reductants are available, be reduced to elemental sulfur.

In U.S. Pat. No. 4,963,329, referred to above, FIG. 7 presents a two-stage scrubber concept where fresh or regenerated reagent (absorption medium) is employed in the second absorption stage of the solute gas absorption scrubber in a recycle mode, wherein the absorption medium contacts an $SO_2$-containing gas stream containing lesser amounts of $SO_2$. To obtain a mass balance on the scrubbing reagent, the amount of fresh or regenerated solvent entering the second absorption stage must be balanced by an equivalent amount of reagent collected from the second absorption stage passing on to the first absorption stage where it contacts a higher level of $SO_2$ in the entering gas stream, thereby ensuring that the absorption medium removed from this first stage may be partially or completely loaded with absorbed $SO_2$, depending on the L/G ratio employed and characteristics of the sorbent system.

It now has been found that certain specific reagents are much better than others, in that the kinetics in the absorption systems described in the above-mentioned patents and applications utilizing Turbotak spray technology is very fast so that equilibrium is very quickly achieved.

Nozzles employed in the duct to achieve formation of the sprays of very fine liquid droplets preferably are of the dual-fluid type wherein atomizing gas and liquid to be sprayed are combined into a gas-liquid mixture which is ejected from the nozzle. Preferably, for larger gas flows and thus larger ducts, the nozzles are cluster nozzles, which result in a plurality of sprays being obtained from a single nozzle, as described in U.S. Pat. Nos. 4,893,752 and 5,170,942, both assigned to the assignee hereof, the disclosures of which are incorporated herein by reference. However, any nozzle technology or design which is capable of generating fine sprays with the desired characteristics of spray pattern, droplet size distribution and surface area may be used.

In some instances, only two such absorption stages are required to achieve 98% removal of the $SO_2$ in the entering gas stream. By varying the liquid-to-gas (L/G) ratio (expressed in US gallons of liquor sprayed/stage per 1000 $ft^3$ of gas being scrubbed), higher or lower percent removal of the $SO_2$ can readily be achieved. Nevertheless, more than two solute gas absorption stages may be used as the need arises.

The excellent kinetics observed in this proprietary approach to absorption of $SO_2$ and other solute gases from off-gas streams depends on two factors, namely, first, the properties of the specific liquid absorption reagent employed and second, the amount of surface area of reagent generated by the spray nozzles within the ducts which comprise the Waterloo Scrubber.

With the counter-current or co-current flow of liquid absorption medium and solute gas-containing stream, the first and second stages of absorption are preferably separated to avoid partially-loaded liquor from passing from the first stage to the second stage. While there are many ways of achieving such separation, the preferred method employs banks of special chevron-type mist eliminators located between the two stages, as described in U.S. patent application Ser. No. 646,197 now U.S. Pat. No. 5,192,517. These mist eliminators have been found to be most suitable for the purposes at hand, because 100% removal of the loaded reagent is not essential while greater than about 99% removal is readily achievable. Such interstage mist eliminators are not required when the absorbing medium is fed in parallel to two or more nozzles mounted sequentially in the sorption duct, preferably spraying the sorbent liquid in an appropriate spray pattern counter-current to the flow of gas, as described in copending U.S. patent application Ser. No. 975,003 now U.S. Pat. No. 5,364,604, filed Nov. 12, 1992, assigned to the assignee hereof and the disclosure of which is incorporated herein by reference, and as shown in FIG. 1.

Alternatively, a combination of parallel and staged flow can be employed where a number of nozzles spraying the sorbent liquor in parallel flow form one sorption stage and whereby the sprayed liquor from one such stage is coalesced, removed and collected and then sprayed in parallel to a number of nozzles in the second stage of the absorber.

It has been found that spraying in parallel flow provides the most energy efficient mode of operation while also effecting very high $SO_2$ removal. The parallel mode of introducing the spray streams into the duct is then the preferred approach to solute gas chemisorption into specific sorbents.

All of these design features, coupled with kinetically-aggressive reagent molecules in the absorption medium, enable $SO_2$ or other solute gas removal from a gas stream to be effected at duct space velocities of up to as high as about 40 to 50 feet per second.

The desorption and regeneration operation of the present invention employs similar techniques to those used to remove solute gases from gas streams described above and in more detail in the aforementioned patents and applications, except that desorption of dissolved solute gas is effected in at least one stage by spraying heated solute gas-loaded liquid absorption medium at an elevated temperature as fine liquid droplets of large surface area using steam as the atomizing gas into a duct which may or may not employ a purge stream of steam into which is desorbed the solute gas. In some instances, the purge gas stream may be eliminated which is the preferred mode of operation. In this preferred mode of operation, the purge steam stream is replaced by the amount of steam introduced through the nozzle plus the amount of solute gas, i.e. $SO_2$, released from the liquid sorbent, and water vapor also released from the liquid sorbent on spraying. Although it is preferred herein to effect the formation of the fine liquid droplets of solute-loaded absorption medium using steam as the atomizing medium, any other convenient procedure may be employed. In such spray pattern of fine liquid droplets, the droplets have a size ranging from about 5 to about 300 microns, preferably about 25 to about 100 microns. The loaded liquid absorption medium is sprayed into the duct, at an elevated temperature to facilitate mass transfer of solute gas from the liquid droplets to the gaseous phase. The temperature employed varies with the particular absorption medium and may vary generally from about 90° to about 200° C.

However, simply because fine liquid droplets of liquid absorbing medium are very effective in removing solute gases from gas streams does not mean that a somewhat analogous technique is effective for regenerating an absorption medium and, in fact, it is surprising that the regeneration procedure provided herein is so effective.

The regeneration operation may be effected by passing the loaded absorption medium to a first stage of steam stripping, removing partially-regenerated solvent from the downstream end of the first stage, forwarding the partially-regenerated solvent to a second stage of steam stripping and recovering the regenerated solvent for recycle to the solute gas absorption operation.

An alternative regeneration procedure involves removal of a percentage of the volume of partially-regenerated solvent from the downstream end of the first regeneration stage and forwarding the same to the first few nozzle stages of the absorber scrubber for reloading, while the remaining volume of partially-regenerated solvent is forwarded to a second stage of stripping, to recover a much leaner sorbent for application to the last nozzles of the absorber with each set of nozzles being sprayed in parallel. For example, if it is assumed that half of the loaded solvent is given a single stage strip and half is given a two stage strip, the half of the solvent given a single stage strip would be fed in parallel flow to the first half of the nozzle (where the solute gas concentration is highest) whereas the half of the solvent given a two stage strip would be fed in parallel flow to the last or downstream nozzles of the absorber to effect complete removal of the solute gas. Depending on the ease of stripping the loaded solvent, which in turn depends on the pKa of the first ionization of the sorbent (amine), single stage stripping may be all that is required (see FIG. 4 attached).

The desorbed sulfur dioxide or other solute gas, which may be, for example, $Cl_2$, HCl, $H_2S$, $CO_2$ or VOC's, is removed from the downstream end of the duct following removal of the partially regenerated solvent by suitable coalescing means, such as a mist eliminator, in a stream of solute gas and water vapor. Following cooling and condensation of water from the gas stream followed by drying, a pure stream of $SO_2$ or other solute gas is recovered, and may be further processed, as desired.

DESCRIPTION OF PREFERRED EMBODIMENT

Figure 2:
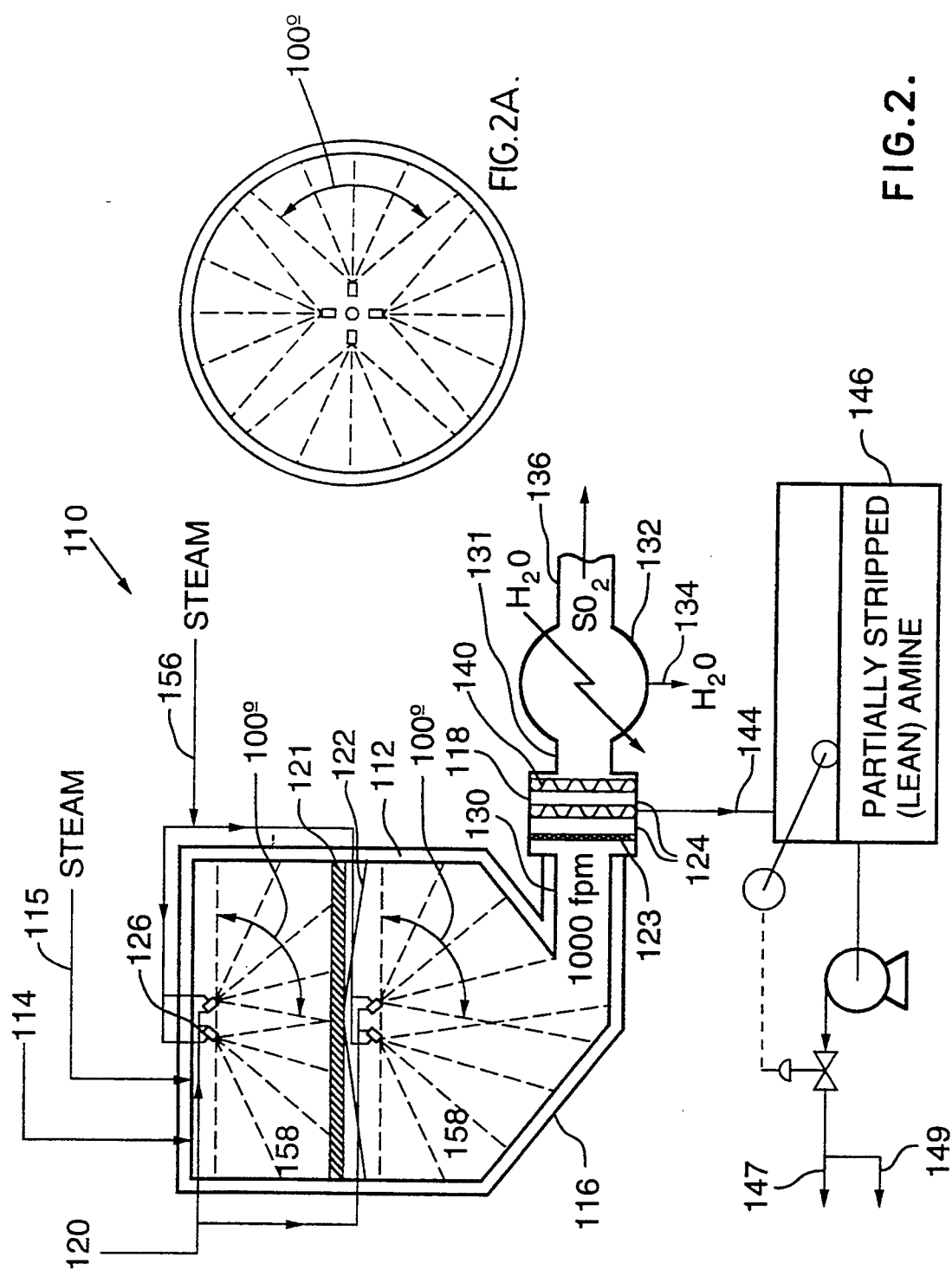
FIG. 2 is a schematic flow sheet of an $SO_2$-stripping operation effected in accordance with one embodiment of the present invention, the two operations being interacted to provide a cycle absorption-desorption operation.

Referring to the drawings, FIGS. 1 and 2 illustrate an integrated absorption-desorption operation for removing $SO_2$ from a gas stream containing the same using a suitable regenerable solvent, with the absorption stage specifically being illustrated in FIG. 1 and the desorption stage specifically being illustrated in FIG. 2. While this specific embodiment is described with respect to the removal of the $SO_2$ from flue gas or other waste and off-gas streams, the invention has broad application to the removal of any solute gas from a gas stream containing the same in any regenerable liquid absorbing medium and the subsequent regeneration of the absorbing medium for reuse in the absorption stage and for recovery of pure solute gas. One example of such a process is the removal of $H_2S$ from "sour" natural gas streams by using a liquid water-soluble amine absorbent and the subsequent steam stripping step whereby the $H_2S$ is recovered in relatively pure form for further processing. The recovery of $CO_2$ from gas streams by similar techniques represents another example.

In FIG. 1, there is illustrated a solute gas sorption apparatus 10. This apparatus 10 and its operation are generally described in the aforementioned U.S. patent application Ser. No. 975,003 now U.S. Pat. No. 5,364,604. The apparatus 10 comprises a generally horizontal or vertical duct 12 having an inlet end 14 for receipt of a sulfur dioxide-containing off-gas stream from which the $SO_2$ is to be removed prior to venting to atmosphere. For this description, the horizontal duct, as shown schematically in FIG. 1, will be used. If the gas stream contains particulate matter, much of this material is removed along with the $SO_2$ in the passage of the gas stream through the duct 12. A heavily particulate-contaminated gas stream is best subjected to a particulate removal operation prior to passage to the duct 12, such as described in the aforementioned U.S. Pat. No. 5,023,064. Such pre-scrubbing also removes HCl, $SO_3$, $H_2SO_4$, and other gases and aerosols, if present, in the $SO_2$-containing gas stream.

Eight dual-fluid nozzles 24 to 31 inclusive are located within the duct 12 and spray absorbing medium co-current or counter-current to the gas flow. Nozzle spacing depends to some degree on the direction of the spray but is the same if only one mode of spray is employed, i.e. all co-current or all counter-current. Nozzles spraying co-currently to the gas flow normally are spaced further apart from each other than when all of the nozzles are sprayed in the counter-current mode.

The dual-fluid nozzles 24 to 31 are designed to produce a spray of very fine liquid droplets of high surface area of a regenerable liquid absorbing medium in the duct 12. Where larger gas flows require larger ducts and larger liquid flows, cluster nozzles, such as those described in the aforementioned U.S. Pat. Nos. 4,893,752 and 5,170,942 are recommended, although any nozzle capable of generating similar fine droplets in the desirable spray patterns may be used.

The downstream end 35 of the duct 12 is connected to an I.D. fan 32 which maintains the flow of gas through the duct 12 and discharges the purified gas stream, now $SO_2$ and particulate free, by duct 33 to a discharge stack 34. An $SO_2$ analyzer 36 may be provided in association with the discharge stack 34 to monitor $SO_2$ content of the discharged gas stream to ensure that the ultimate discharge is within allowable limits or meets any other levels as desired.

Located in the downstream end 35 of the duct 12 and before the I.D. fan 32 is a mist eliminator 38 which serves to remove and recover the loaded amine absorbing medium from the purified gas stream to an efficiency of greater than 99.995%. It may be preferred to place the mist eliminator after the fan because the turbulent action of the fan extends the $SO_2$ removal process while agglomerating and removing 85 to 90% of the liquid amine solution from the gas stream prior to entering the mist eliminator.

A liquid regenerable solvent or sorbent for sulfur dioxide, such as an aqueous solution of an aliphatic, alicyclic or heterocyclic amine or amine half salt, is fed in parallel flow to the dual-fluid spray nozzles 24 to 31 in duct 12. Such solvent is fed by line 44 to the nozzles 24 to 31 and comprises make-up quantities of fresh solvent in an amount required to make up losses and regenerated solvent produced employing the procedure of FIG. 2 described below. Atomizing air or other gas is fed to the nozzles 24 to 31 by line 46. The atomizing gas generally is applied to the dual-fluid spray nozzles 24 to 31 at a pressure of about 20 to about 100 psi, preferably about 20 to about 70 psi and more preferably about 40 to about 70 psi.

The air and liquid solvent form an intimate mixture in the nozzles 24 to 31 which is sprayed as a mass 48 of fine liquid droplets of high surface area into the duct 12, which contact the gas stream flowing through duct 12. Such liquid droplets generally range in size from about 5 to about 300 microns, preferably about 25 to about 100 microns.

The liquid solvent fed to nozzles 24 to 31 is low in dissolved $SO_2$ concentration (or contains no $SO_2$, depending on the efficiency of removal of $SO_2$ in the stripping operation) while the gas stream progressively is depleted in $SO_2$ content as a result of successive contacts with the lean sorbent sprays in duct 12. Accordingly, the $SO_2$ is rapidly and substantially chemisorbed in the liquid droplets as it passes through the duct 12.

The entrained liquid droplets in the flowing gas stream in duct 12 are coalesced and removed by the mist eliminator 38 to 99.995% and the loaded solvent passes by line 50 from the mist eliminator 38 to a tank 52. The $SO_2$-free gas passes through the mist eliminator 38, through the outlet 35 to the fan 30 and then to the vent stack 34.

Referring now to FIG. 2, there is illustrated therein a loaded absorbing medium regeneration apparatus 110 which comprises a horizontal or vertical chamber 112 having an inlet end 114 for the optional receipt of a low pressure steam purge stream 115. The chamber 112 may be arranged vertically, as shown, with the gas flow going either up or down but preferably down using co-current sprays. The chamber 112 is provided with an outer heating means 116 to heat the chamber sufficiently to avoid condensation of steam therein or to provide additional heat to further promote stripping. The chamber 112, if arranged horizontally, may have a slight (e.g. about 1°) incline towards its downstream end to facilitate removal of any coalesced solvent from the walls of the chamber 112.

A mist eliminator 118 of special design to effect coalescence of liquid droplets passing therethrough is provided. Dual-fluid nozzles 126 are positioned in the chamber 112 and are constructed to produce very fine liquid droplets of high surface area of the heated loaded liquid absorbing medium and preferably comprise cluster nozzles, such as those described in the aforementioned U.S. Pat. Nos. 4,893,752 and 5,170,942, although any other suitable nozzle may be employed.

The atomizing gas used in the desorption process nozzles is steam employed at a pressure necessary to generate a proper droplet size distribution. The entire system, when operating at atmospheric pressure, is maintained at approximately 100° C. regardless of steam temperature and liquid temperature, since the excess heat is rapidly spent in evaporating water from the amine solution and expelling some of the $SO_2$. In cases where the sorbent employed cannot withstand temperatures of 100° C., the system must be operated at a reduced pressure to maintain the desired lower saturation temperature. The system can be operated at temperatures greater than 100° C. by operating under the pressure necessary to provide the requisite saturation temperature.

Nozzles 126 are illustrated as spraying the absorbing medium co-current to the direction of flow of the $SO_2$ and steam released from the absorbing medium through the duct 112, although counter-current flow may be preferred. If a purge stream of steam is required, it also may flow co-current to the sprays. Co-current spraying of absorbing medium and released gas steam into the duct 112 from nozzles 126 is the preferred method of operation. Where larger liquid flows are to be stripped, a number of atomizing nozzles located in a larger chamber may be used, as specifically illustrated in FIG. 2, which schematically illustrates a steam stripper that can include from one to five nozzles in a smaller chamber or as many as 10 nozzles in a two level chamber. The upper and lower sections of the chamber are separated by an open coalescing pad 121 which serves to separate out a major portion of the stripped sorbent from the $SO_2$/steam gas stream it produces during the desorption step. The coalesced liquid droplets are diverted to the sides of the chamber by the deflector, 122, as shown. The gap between the outside diameter of deflector 122 and the inside diameter of the chamber is sufficient to allow free passage of the $SO_2$/steam gas stream to the lower section at a very low pressure drop, typically about 0.1 cm $H_2O$.

In the design of the stripping device, the most important criteria are:

1. Spray density of each nozzle discharge.
2. Distance from nozzle to nearest obstruction, i.e. chamber wall or coalescing pad (residence time).

An I.D. fan is located downstream to ensure passage of the gas stream through the entrainment separator and condenser and delivery of product $SO_2$ gas stream as required.

The downstream end 130 of the chamber 112 is connected by line 131 to a cooler-condenser 132 of any convenient construction wherein steam is condensed and removed as water in line 134, resulting in a clean saturated flow of pure $SO_2$ in line 136. This by-product pure $SO_2$ gas stream may be used as such, may be converted into other useful chemicals, such as sulfuric acid, may be reduced to elemental sulfur, or otherwise processed.

At the immediate-downstream end 130 of the chamber 112 is a mist eliminator 118 which serves, in combination with a coalescing pad 123 of "knit mesh" or of several layers of a fine Kimre ® pad which also acts as a coalescing media which improves the overall recovery of solvent from the gas stream. Liquid collected in the mist eliminator 140 is returned by line 144 to a tank 146, from which it is pumped by line 147 to the lean amine hold tank 148 (FIG. 1). A portion of the first stage stripped amine may be sent to a second stage stripper by line 149. The second stage stripper is similar to the first stage stripper, but of a smaller size.

The loaded liquid solvent in line 50 (FIG. 1) is forwarded to a solvent holding tank 52 and then is forwarded by line 54, pump 55 and a solvent heater 56 to the nozzles 126 located in the chamber 112 via line 120 (FIG. 2). Atomizing steam also is forwarded to the nozzle 126 by line 156. The atomizing steam generally is applied to the dual-fluid spray nozzles 126 at a pressure of about 5 to about 100 psi, preferably about 5 to about 70 psi and more preferably about 10 to about 50 psi.

The steam and loaded liquid solvent form an intimate saturated mixture in nozzle 126 which is sprayed as a mass 158 of fine liquid droplets of high surface area into the chamber 112. The liquid droplets generally are sized from about 5 to about 300 microns, preferably about 25 to about 100 microns. The high surface area of liquid droplets contained in the flowing hot purge gas stream in the chamber 112 and the relatively high temperature of the droplets results in a rapid and irreversible mass transfer of $SO_2$ gas to the gas phase at approximately 100° C., resulting in partial regeneration of the liquid absorbent medium.

The entrained liquid droplets in the flowing purge gas stream in chamber 112 are removed and coalesced by mist eliminator 118. The resulting partially regenerated solvent passes by line 144 from the mist eliminator 118 to a tank 146. The solvent-free gas stream exits the downstream end 130 of the chamber 112 by line 131 and passes to the cooler-condenser 132. A vacuum pump or blower (not shown) may be employed to maintain the chamber 112 under a reduced pressure, to enable operation at a lower temperature to be effected, if so desired. Similarly, if a positive pressure is to be maintained in the stripper, a pressure relief valve may be used to allow the wet $SO_2$ gas to exit the system.

The partially-regenerated solvent is forwarded by line 147 back to the absorbing stage or to a second stage of stripping via line 149 to effect further $SO_2$ removal resulting in a lean amine of superior properties when compared to that produced by a single stage of stripping.

The procedure of FIG. 2 is described with respect to co-current flow of loaded solvent spray in parallel flow from a number of orifices 126 and purge released gases is an analogous manner to that described in the aforementioned U.S. patent application Ser. No. 975,003 for absorbing the solute gas. In such operation, the duct or chamber in which the regeneration is effected may be vertical or horizontal and the spray nozzles may be oriented to effect spraying counter-current to or cocurrent with the direction of flow of the gas stream which may flow either upward or downward, but preferably downward in flow while using nozzle spraying co-current or cross-current to the gas stream.

While two stages of steam stripping are mentioned above, fewer or additional stages may be employed, as desired, depending on the concentration of dissolved solute gas in the loaded absorbing medium, the nature of the absorbing medium, and the degree of regeneration required.

To illustrate one relationship between the nature of the absorbing medium and the ease of stripping, single stage stripping was conducted with three different amines. The pKa values for each of the amines ranged from a low of 4.9, a medium value of 5.6 and a high value of 7.6.

Figure 4:
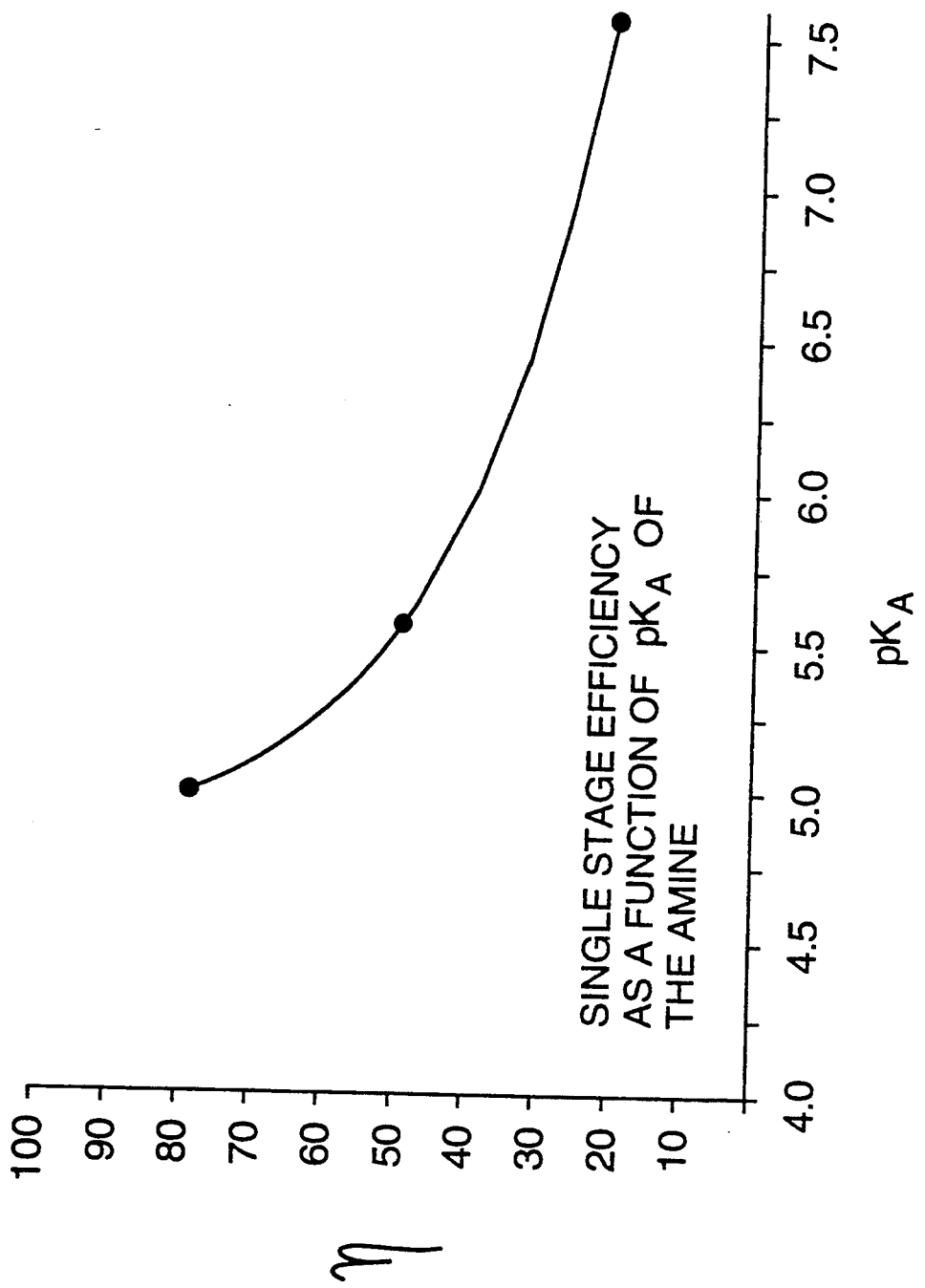
FIG. 4 contains a graphical relationship between single stage stripping efficiency and the pKa valves for three amines when employing spray technology as described herein.

FIG. 4 illustrates the relationship between single stage stripping efficiency and the pKa values for the three amines when employing the spray technology described herein.

Obviously, if a functional amine extractant is available with a slightly lower pKa value, single stage stripping is all that is required for the recycle of the lean sorbent amine.

With the low pKa amine, whereas single stage efficiency over a range of experiments gave values ranging from 72 to 81% $SO_2$ removal, if this stripped amine was given a second stage strip under the same conditions, approximately 65% $SO_2$ removal was found. Third stage stripping of the second stage amine product gave between 31 and 47% $SO_2$ removal. The overall $SO_2$ removal after three stripping stages ranged from 94 to 95.8%.

In a closed cycle (absorption-desorption) system combining the operations of FIGS. 1 and 2, the goal is to optimize the entire system. The optimization involves the establishment of the minimum degree of stripping commensurate with achieving the degree of $SO_2$ removal desired at the optimal L/G ratio. Thus, overall, the optimal situation may be to use single stage stripping coupled with a slightly higher L/G ratio rather than conduct two or three stages of stripping so that a smaller L/G ratio can be used.

Coupled with the above considerations is the amount of steam required per pound of $SO_2$ stripped. The following Table I presents the effect of steam pressure (at the nozzle) on steam consumption for single stage stripping and for three stage stripping. It will be seen that steam pressure has very little effect on the amount of $SO_2$ stripped; i.e. for all single stage stripping, approximately 75% of the $SO_2$ was stripped in this series of experiments while for three stage stripping roughly 95% $SO_2$ was removed.

TABLE I

NOZZLE STEAM CONSUMPTION VS. STEAM PRESSURE

| Steam Pressure, psig | Single State #Steam/#$SO_2$ | % $SO_2$ Removed | Three stage #Steam/#$SO_2$ | % $SO_2$ Removed |
|---|---|---|---|---|
| 15 | 1.8 | 74% | 3.48 | 94% |
| 30 | 3.5 | 72% | 6.8 | 94.8% |
| 70 | 11.5 | 77% | 17.1 | 95.8% |

In describing the above approach applied specifically to in-duct scrubbing to remove $SO_2$ from various emitting sources, as depicted schematically in FIG. 1, those skilled in the art can readily perceive that such an approach results in relatively smaller equipment than any conventional absorption process can adopt. This result infers significant advantages where retrofit applications exist as well as much smaller capital needs for a variety of purposes. In addition, the liquid-to-gas ratio used to achieve high removal efficiency of the $SO_2$ as shown in the absorption procedure of FIG. 1 is consistently much lower than previously found in any other system.

The fact that an in-duct absorption process is so successful encouraged us to investigate the use of similar technology to perform the stripping step which, in effect, reverses the absorption step. The basis of this approach, according to the invention, depends again on the creation of a very large liquid surface area, found to be as high as 50,000 ft$^2$ per gallon of liquid sprayed, in the chamber 112 of the desorption apparatus 110. Such generation of a large surface area is coupled with heating the loaded absorbing medium by steam or other means to a temperature where the vapour pressure of $SO_2$ over the solvent is sufficient to release the $SO_2$ under the dynamic conditions resulting when loaded sorbent is sprayed but below a temperature that would be deleterious to the absorbing medium. The temperature required to achieve the release of $SO_2$ or other solute gas from the absorbing medium varies with the specific reagent used and the solute gas removed and is limited solely by the stability of the absorbent medium used. Thus, efficient stripping of $SO_2$ or other solute gas from the sorbent medium is effected at relatively lower steam consumption and much shorter exposure time at elevated temperature, with consequent decreased chemical oxidation or degradation of the solvent stream than in conventional steam stripping operations. Residence time can be controlled by the length and diameter of the chamber employed per stage.

In the desorption system of FIG. 2, low gas velocities are employed, equivalent to the amount of $SO_2$ and water vapor generated per unit time plus the amount, if any, of low pressure steam introduced to purge the system plus the amount of steam employed in the dual-fluid nozzles to effect atomization of the loaded and heated solvent. Accordingly, the size of the stripping equipment (chamber 112) can be much smaller than the size of the related absorption equipment (duct 12) since the total gas flow through the chamber 112 is considerably smaller than that flowing through the duct 12, i.e. <1%, although the amount of sorbent sprayed is the same for the first stage strip.

Specific solvents may require more than one stage to effect the degree of regeneration (desorption) desired in the procedure of FIG. 2. While one may consider employing a higher temperature to achieve better stage-wise separation (desorption), the ability to proceed in this manner also depends on the stability of the specific reagent to elevated temperature, as this relates to oxidation and/or disproportionation of the solvent or to the formation of heat-stable salts in the solvent, which must be removed to retain the absorption capability of the solvent system.

Figure 3:
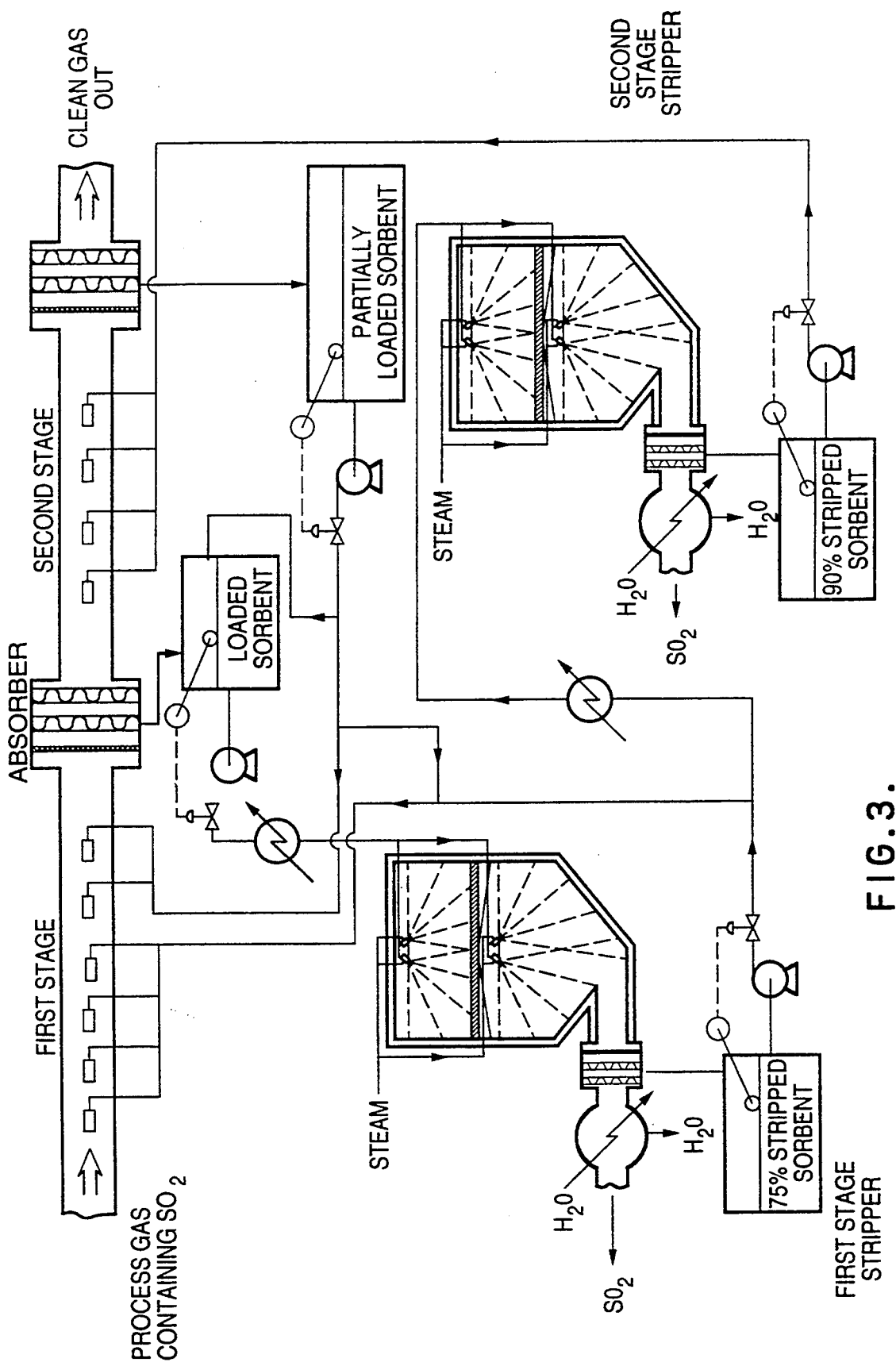
FIG. 3 is a schematic flow sheet of an alternative cyclic absorption-desorption operation to that illustrated in FIGS. 1 and 2, provided in accordance with another embodiment of the invention.

Shown in FIG. 3 is a schematic flowsheet that includes a two stage absorber coupled with a two stage stripper. Each stage of the absorber consists of a number of nozzles spraying the absorbing solution in parallel flow with the first stage, which contacts the inlet process gas stream which contains the highest concentration of the solute gas and the second stage contacting a depleted solute-containing gas stream. The sorbent used for the first stage of absorption has been partially regenerated, i.e. about 75% stripped of its solute gas content. As such, in contact with a solute-rich gas stream, this sorbent should be driven to a high loading level while removing a major amount of the solute gas from the entering gas stream. The loaded sorbent is removed from the gas stream by a suitable mist eliminator (~99% effective) and returned to the first stage stripper.

A fraction of the partially regenerated sorbent from the stage 1 stripper is sent to a 2nd stage stripper where additional solute gas is removed so that in total (1st stage plus 2nd stage) about 90% of the solute gas has now been removed. The resulting regenerated sorbent is used in the second stage of the absorber where its low solute gas content insures excellent removal of solute gas from the process gas being treated. The partially loaded sorbent collected from the second stage absorber can be processed in one of three manners or a combination of all three manners as follows:

(a) The collected partially loaded sorbent can be added to the loaded sorbent from stage 1 and then be sent to the stripping circuit.
(b) The partially loaded sorbent from stage 2 can be added to the flow of partially regenerated sorbent used in stage 1 of the absorber.
(c) The partially loaded sorbent from stage 2 can be sent directly to several separate nozzles added to stage 1 absorber. Depending on its loading level, the partially loaded sorbent from stage 2 can be used before or after the normal stage 1 nozzles. In the schematic, implementation is shown to be after the parallel set of stage 1 nozzles which would indicate that the loading of the sorbent from stage 2 was less than the loadings of the partially regenerated sorbent. This would depend entirely on the relative amounts of sorbent being regenerated from each stripper stage. If the portion receiving a two stage strip was low, i.e. <15% of the total sorbent flow, its further use in stage 1 would not be of interest. If as much as half of the loaded solvent was given a second strip, most of the partially loaded sorbent from stage 2 would be recycled to stage 1 to ensure good loading levels had been attained prior to the stripping step. The higher the loading of the sorbent, the less costly the stripping step in terms of #steam/#$SO_2$ recovered.

EXAMPLES

An experimental stripping unit was set up with a single stage of stripping to test the feasibility of the stripping procedure and to test the effect of various parameters on the efficiency of stripping of absorbed $SO_2$ from three aqueous amine absorbents, namely triethanolamine (TEA) and two proprietary amines (PA1 and PA2).

In the experiments, a single dual-fluid spray nozzle was axially located in an insulated, jacketed horizontal duct of 12 inches I.D. and a length of 12 feet to spray co-current with the direction of flow of a small purge stream. A chevron-type demister was located at the downstream end to remove entrained partially stripped liquid droplets. The steam purge stream was passed through the duct from the upstream end to the downstream end. Steam also was fed to the dual-fluid spray nozzle.

The purpose of the steam purge used in the laboratory experiments was to provide enough gas velocity to make the chevron-type entrainment separator operate in an effective manner. If the steam purge is not used, the entrainment separator does not remove entrained amine from the gas phase due to its very low velocity.

In practice, a steam purge most probably will not be required. The following calculation and assumptions are based on a 150 MW FGD scrubber/absorber and its Turbotak stripper:

ACFM≅450,000

L/G=1.2 USgal/1000 ft$^3$

→=540 USgpm of sorbent

Assume 2# steam/#$SO_2$ is required for nozzle spraying and 0.5# steam/#$SO_2$ for pre-heating the rich amine solution prior to spraying or a total steam consumption of 2.5# steam/#$SO_2$ stripped.

Roughly 200# $SO_2$ will be stripped per minute which, at 100° C., is equivalent to 1500 cfm of $SO_2$.

It has been observed that between 0.5 and 1.5# steam per #$SO_2$ is co-stripped from the amine along with the $SO_2$. Assuming an average of 1# steam/#$SO_2$ being costripped brings the total potential flow of steam in the system to 3.5#/#$SO_2$. (200#SO2/min)=700# steam/m which at its saturation temperature has a specific volume of 26.8 cuft/lb which gives a volumetric flow of 18,700 cfm steam.

The total volume of steam plus $SO_2$ comes to ~20,000 acfm. Using an entrainment separator face velocity of ~1000 fpm results in a mist eliminator cross-sectional area of ~20 ft$^2$.

The conclusion this gives is that, for larger systems, the need for a purge steam will not be required.

The stripping data which has been obtained is set forth in the following Table II:

TABLE II

| Run # | Desorber Operating Conditions | | | | Stripping Data Mol/Mol | | $SO_3^-$ |
|---|---|---|---|---|---|---|---|
| | Steam Purge Rate (cfm) | Sorbent Temp. (°F.) | Sorbent Flow Rate (gpm) | Nozzle Pressure (psig) | Rich Sorbent $SO_3^-$ | Stripped Sorbent $SO_3^-$ | Stripping Efficiency (%) |
| PA1 Exps. | | | | | | | |
| 1 | 121 | 175 | 0.25 | 71 | 0.211 | 0.102 | 51.66 |
| 2 | 121 | 185 | 0.25 | 71 | 0.211 | 0.109 | 48.34 |
| 3 | 126 | 200 | 0.25 | 71 | 0.211 | 0.098 | 53.55 |
| 4 | 124 | 210 | 0.25 | 71 | 0.211 | 0.106 | 49.76 |
| 5 | 97 | 185 | 0.25 | 50 | 0.211 | 0.123 | 41.71 |
| 6 | 97 | 225 | 0.25 | 50 | 0.211 | 0.117 | 44.55 |
| 7 | 75 | 240 | 0.25 | 50 | 0.211 | 0.129 | 38.86 |
| 8 | 75 | 270 | 0.25 | 50 | 0.211 | 0.111 | 47.39 |
| 9 | 57 | 160 | 0.25 | 50 | 0.217 | 0.119 | 45.16 |
| 10 | 57 | 180 | 0.25 | 50 | 0.217 | 0.121 | 44.24 |
| 11 | 57 | 190 | 0.25 | 50 | 0.217 | 0.124 | 42.86 |
| 12 | 57 | 210 | 0.25 | 50 | 0.217 | 0.112 | 48.39 |
| 13 | 82 | 220 | 0.25 | 71 | 0.432 | 0.320 | 25.93 |
| 14 | 80 | 210 | 0.25 | 71 | 0.432 | 0.293 | 32.18 |
| 15 | 70 | 195 | 0.25 | 71 | 0.432 | 0.332 | 23.15 |
| 16 | 83 | 183 | 0.25 | 71 | 0.432 | 0.313 | 27.55 |
| TEA Exps. | | | | | | | |
| 1 | 0 | 220 | 0.3 | 50 | 0.614 | 0.392 | 36.16 |
| 2 | 0 | 235 | 0.3 | 50 | 0.614 | 0.393 | 36.00 |
| 3 | ~25 | 230 | 0.3 | 50 | 0.614 | 0.428 | 30.29 |
| 4 | ~50 | 235 | 0.3 | 50 | 0.614 | 0.451 | 26.55 |
| 5 | 101 | 165 | 0.25 | 71 | 0.33 | 0.260 | 21.21 |
| 6 | 101 | 225 | 0.25 | 71 | 0.33 | .280 | 15.15 |
| 7 | 101 | 205 | 0.25 | 71 | 0.33 | 0.260 | 21.21 |
| PA2 Exps. | | | | | | | |
| 1 | 98 | 215 | 0.25 | 70 | .745 | 0.140 | 81 |
| 2 | 98 | 175 | 0.25 | 70 | .745 | 0.188 | 75 |
| 3 | 153 | 171 | 0.25 | 70 | .751 | 0.148 | 80 |
| 4 | 79 | 165 | 0.25 | 70 | .751 | 0.157 | 79 |
| 5 | 108 | 195 | 0.25 | 30 | .762 | 0.174 | 77 |
| 6 | 108 | 195 | 0.25 | 30 | .762 | 0.230 | 69 |

TABLE II-continued

| | Desorber Operating Conditions | | | | Stripping Data Mol/Mol | | $SO_3^-$ |
|---|---|---|---|---|---|---|---|
| Run # | Steam Purge Rate (cfm) | Sorbent Temp. (°F.) | Sorbent Flow Rate (gpm) | Nozzle Pressure (psig) | Rich Sorbent $SO_3^-$ | Stripped Sorbent $SO_3^-$ | Stripping Efficiency (%) |
| 7 | 111 | 195 | 0.25 | 50 | .762 | 0.175 | 77 |
| 8 | 111 | 195 | 0.25 | 50 | .762 | 0.199 | 74 |
| 9 | 121 | 195 | 0.25 | 70 | .762 | 0.200 | 72 |
| 10 | 121 | 195 | 0.25 | 70 | .762 | 0.177 | 74 |
| 11 | 108 | 215 | 0.25 | 30 | .749 | 0.177 | 77 |
| 12 | 111 | 215 | 0.25 | 50 | .749 | 0.199 | 74 |
| 13 | 121 | 215 | 0.25 | 70 | .749 | 0.171 | 77 |
| 14 | 30 | 218 | 0.25 | 15 | .879 | 0.232 | 74 |
| 15 | 50 | 219 | 0.25 | 30 | .879 | 0.242 | 72 |
| 16 | 64 | 216 | 0.25 | 70 | .879 | 0.202 | 77 |
| The following experiments are for second stage stripping: | | | | | | | |
| 17 | 65 | 215 | 0.25 | 13.5 | .264 | 0.092 | 65 |
| 18 | 104 | 215 | 0.25 | 30 | .264 | 0.084 | 68 |
| 19 | 62 | 215 | 0.25 | 50 | .264 | 0.091 | 65 |
| 20 | 107 | 215 | 0.25 | 50 | .264 | 0.089 | 66 |
| 21 | 50 | 217 | 0.25 | 30 | .261 | 0.108 | 59 |
| 22 | 44 | 219 | 0.25 | 15 | .304 | 0.103 | 66 |
| 23 | 50 | 219 | 0.25 | 30 | .306 | 0.106 | 65 |
| 24 | 44 | 219 | 0.25 | 70 | .238 | 0.084 | 65 |

As may be seen from the data for PA1, the best single stripping efficiency obtained was that in Example 3 of 53.55%. Attaining this degree of stripping in a single stage of stripping indicates that substantially complete stripping is attainable using multiple stripping stages. It is also considered that improved single-stage stripping can be achieved via an optimization process.

From the data presented for the experiments with PA2, the best single stripping efficiency was 81% and the average stripping efficiency over the 16 runs reported, was about 75%, well above the best reported for PA1. The experiments with PA2 followed those with PA1, so one could expect knowledge gained could translate to an improved performance with PA1.

Based on the overall results with perhaps a heavier emphasis on results from the PA2 experiments, it can be concluded that:

1. $SO_2$ removal efficiency is relatively independent of the steam pressure at the nozzles; and
2. Other than providing enough gas velocity to make the entrainment separator work, the $SO_2$ stripping efficiency is relatively independent of the rate of the steam purge, thus indicating it is not required to optimize stripping.

Both of these conclusions were unexpected because higher steam pressure at the nozzle would generate smaller droplets and thus a greater surface area which would normally be expected to promote surface related phenomenon while a larger steam purge would added more heat to the area of stripping while providing a means to separate or dilute the $SO_2$ gas phase from the liquid amine droplets.

3. An increase in flow through a single nozzle decreased $SO_2$ stripping efficiency.

In case one, the flow of loaded amine was tripled with the same nozzle and steam pressure, i.e. to give much larger droplets, resulting in a 40% drop in stripping efficiency.

In case two, a properly sized nozzle to handle the tripled flow of loaded amine and give the same droplet size distribution also resulted in a drop in stripping efficiency but this time only about 15%. This result indicates some limitation to the spray density, i.e. the amount of solution sprayed from each orifice. It also indicates the need, when using cluster nozzles, to restrict the flow per orifice while separating each spray pattern significantly.

SUMMARY OF DISCLOSURE

In summary of this disclosure, the present invention provides a novel regeneration procedure for solute gas-loaded liquid absorption media which is simple, effective, provides a lower steam consumption per pound of $SO_2$ released and is of a low capital cost as compared to conventional column-type steam strippers. Modifications are possible within the scope of this invention.

What I claim is:

1. A method for the removal of a solute gas from a solute gas-laden aqueous absorbing medium, which comprises:
   (a) providing a chamber having an inlet thereto and an outlet therefrom and heating means operatively associated therewith for maintaining the temperature therein above the adiabatic saturation temperature of steam,
   (b) injecting said absorbing medium at an elevated temperature directly into said chamber to form at least one spray pattern of said absorbing medium in said chamber containing liquid droplets ranging in size from about 5 to about 300 microns,
   (c) desorbing dissolved solute gas from said liquid droplets of absorbing medium to form at least in part a flowing gas stream in said chamber,
   (d) agglomerating said liquid droplets at a downstream end of said chamber to remove entrained liquid droplets from said flowing gas stream to form an at least partially regenerated aqueous absorbing medium, and
   (e) discharging a gaseous mixture comprising solute gas from said downstream end of said chamber and recovering said solute gas from said gaseous mixture.

2. The method of claim 1, wherein said absorbing medium is injected into said chamber from at least one dual-fluid spray nozzle disposed in said chamber and to which steam is fed as a gaseous fluid to effect atomization of said absorbing medium to form said spray pattern.

3. The method of claim 2, wherein said absorbing medium is injected directly into said chamber from two or more dual-fluid spray nozzles to form a plurality of said spray patterns in said chamber which do not substantially overlap one another.

4. The method of claim 2 which is effected to form a partially-regenerated aqueous absorbing medium, and including:
  (i) injecting said partially-regenerated aqueous absorbing medium into a further chamber, by atomization from a dual-fluid nozzle in said further chamber using steam to form a spray pattern of the partially-regenerated aqueous absorbing medium in said further chamber containing liquid droplets ranging in size from about 5 to about 300 microns,
  (ii) desorbing dissolved solute gas and water vapor from said liquid droplets of partially-regenerated absorbing medium to form at least in part a flowing gas stream in said further chamber,
  (iii) agglomerating said liquid droplets at said downstream end of said further chamber to remove entrained liquid droplets from said gas stream to form an at least further regenerated aqueous absorbing medium, and
  (iv) discharging a gaseous mixture comprising solute gas and steam from said downstream end of said further chamber and recovering said solute gas from said gaseous mixture.

5. The method of claim 1 wherein a purge gas stream comprising steam is fed to said inlet of said chamber to provide a portion of said flowing gas stream in said chamber not provided by desorbed solute gas and water vapor.

6. The method of claim 4 wherein a purge gas stream comprising steam is fed to an inlet of said further chamber to provide a portion of said flowing gas stream in said further chamber not provided by desorbed solute gas and water vapor.

7. The method of claim 1 wherein said chamber is provided in a substantially vertical orientation and said absorbing medium is injected into said chamber co-current to the direction of flow of gas stream through said chamber.

8. The method of claim 1 wherein said solute gas is $SO_2$, said absorbing medium is an aqueous solution of an organic amine capable of $SO_2$ absorption and of reversibility of the absorption process.

9. The method of claim 1 wherein said solute gas is sulfur dioxide and said absorbing medium is an aqueous amine solution or aqueous amine salt solution.

10. The method of claim 9 wherein said aqueous amine salt solution is an aqueous solution of a water-soluble single salt of a secondary or tertiary di-amine.

11. The method of claim 9 wherein said aqueous amine solution is an aqueous solution of a hydroxyalkyl 2-piperazinone.

12. The method of claim 1 wherein said solute gas is selected from the group consisting of carbon dioxide, hydrogen sulfide and mixtures thereof.

13. The method of claim 1 wherein said solute gas is a VOC.

14. The method of claim 2 wherein said liquid droplets in said spray pattern are sized from about 5 to about 100 microns.

15. The method of claim 2 wherein said atomizing is effected at a pressure of about 5 to about 100 psi.

16. The method of claim 15 wherein said atomizing is effected at a pressure of about 5 to about 70 psi.

17. The method of claim 16 wherein said atomizing is effected at a pressure of about 5 to about 50 psi.

18. The method of claim 1 wherein said absorbing medium has a temperature of about 90° to about 200° C. when injected into said chamber.

19. The method of claim 1 wherein said solute gas-laden aqueous absorbing medium is formed in a solute gas-removal process for removing solute gas from an off-gas stream prior to venting said solute gas-laden aqueous absorbing medium using said absorbing medium.

20. A method for the removal of a solute gas from a gas stream containing the same using a regenerable aqueous solvent for said solute gas, which comprises:
  A. effecting removal of solute gas from said gas stream to form a purified gas stream by the steps of:
    (i) passing said gas stream through a chamber having an inlet thereto and an outlet therefrom,
    (ii) injecting said regenerable aqueous solvent directly into said solute gas containing gas stream from at least two dual-fluid spray nozzles located in longitudinally spaced-apart relationship in said chamber by atomizing gas to form a spray pattern of said regenerable aqueous solvent in said chamber from each said nozzle and containing liquid droplets ranging in size from about 5 to about 100 microns,
    (iii) absorbing solute gas from said gas stream into said liquid droplets at a first temperature,
    (iv) agglomerating said liquid droplets contained in said chamber to remove entrained liquid droplets from said gas stream to form a solute gas-laden aqueous solvent, and
    (v) discharging said purified gas stream from said downstream end of said chamber;
  B. effecting regeneration of said solute gas-laden aqueous solvent to remove and recover dissolved solute gas and regenerate the solvent for recycle to step A for use as said regenerable aqueous solvent therein by steps of:
    (i) providing a further chamber having an inlet thereto and an outlet therefrom and heating means operatively associated therewith for maintaining the temperature therein above the adiabatic saturation temperature of steam,
    (ii) heating and then injecting said solute gas-laden aqueous solvent directly into said further chamber from at least one dual-fluid spray nozzle located in said further chamber by atomizing steam to form a spray pattern of said heated solute gas-laden liquid solvent in said further chamber from each said nozzle and containing liquid droplets ranging in size from about 5 to about 300 microns,
    (iii) desorbing dissolved solute gas and water vapor from said liquid droplets of solute gas-laden aqueous solvent to form at least in part a flowing gas stream in said further chamber,
    (iv) agglomerating said liquid droplets contained in said further chamber to remove entrained liquid droplets from said flowing gas stream to form a regenerated aqueous solvent, and
    (v) discharging a gaseous mixture comprising solute gas and steam from said outlet from said further chamber and recovering said solute gas from said gaseous mixture; and
  C. recycling said regenerated aqueous solvent to step A as said regenerable aqueous solvent.

21. The method of claim 20 wherein steps A (ii) to (iv) include:
   (a) agglomerating said liquid droplets contained in said chamber to remove entrained liquid droplets from said gas stream at a location intermediate between said dual-fluid spray nozzles to form said solute gas-laden aqueous solvent,
   (b) agglomerating liquid droplets contained in said chamber to remove entrained liquid droplets from said gas stream at said outlet from said chamber to form a partially solute gas-laden aqueous solvent,
   (c) injecting said regenerable aqueous solvent only from said dual-fluid spray nozzle immediately upstream of said downstream end of said chamber, and
   (d) injecting said partially solute gas-laden aqueous solvent from said dual-fluid spray nozzle immediately downstream of an upstream end of said chamber.

22. The method of claim 20 wherein said steps B (ii) to (iv) include:
   (a) injecting said heated solute gas-laden aqueous solvent directly into said further chamber in parallel flow from at least two dual-fluid spray nozzles located in longitudinally spaced-apart relationship in said further chamber and each forming a spray pattern in said further chamber; and
   (b) agglomerating said liquid droplets contained in said further chamber to remove entrained liquid droplets from said flowing gas stream at the outlet from said further chamber to form an at least partially-regenerated aqueous solvent.

23. The method of claim 20 wherein a purge gas stream comprising steam is fed to said inlet of said further chamber to provide any portion of said flowing gas stream in said further chamber not provided by desorbed solute gas and water vapor.

24. The method of claim 20 wherein said solute gas is sulfur dioxide and said absorbing medium is an aqueous amine solution.

25. The method of claim 1, wherein said chamber is oriented vertically.

26. The method of claim 25, wherein the at least one spray pattern is co-current to the flow of $SO_2$ and water vapour generated within the chamber by desorption of an $SO_2$-laden aqueous absorbing medium.

27. The method of claim 1, wherein the at least one spray pattern is co-current to the flow of $SO_2$ and steam generated within the chamber by desorption of an $SO_2$-laden aqueous absorbing medium.

28. The method of claim 20, wherein a single stage strip provides lean sorbent adequate to effect the desired degree of solute gas removal in the absorber step (A).

29. The method of claim 28, wherein a second stage strip is effected on a fraction of the single stage stripped sorbent so as to optimize solute gas removal in the absorber step (A).

30. The method of claim 29, wherein the single stage stripped sorbent is used for those nozzles located closest to the inlet of the absorber where contact with the highest solute gas concentration contributes to the effectiveness of this approach without the necessity of increasing a L/G ratio and wherein the second stage stripped sorbent is used for the nozzles located closest to the discharge end of the absorber where this would effect very low concentration of the solute gas in the discharged gas stream.

* * * * *